United States Patent [19]

Kikuchi et al.

[11] Patent Number: 5,546,490
[45] Date of Patent: Aug. 13, 1996

[54] OPTICAL FIBER CONNECTOR

[75] Inventors: Kimihiro Kikuchi, Marumori-machi; Takashi Kihara; Ken Okochi, both of Kakuda, all of Japan

[73] Assignee: Alps Electric Co., Ltd., Tokyo, Japan

[21] Appl. No.: 422,718

[22] Filed: Apr. 14, 1995

[30]       Foreign Application Priority Data

Apr. 28, 1994 [JP] Japan .................................. 6-114017

[51] Int. Cl.⁶ ............................................. G02B 6/36
[52] U.S. Cl. ................................................... 385/93
[58] Field of Search ............................ 385/88–94, 78, 385/81, 139, 80, 87, 136, 137

[56]                References Cited

U.S. PATENT DOCUMENTS 5,042,891   8/1991   Mulholand et al. ...................... 385/93

5,307,435   4/1994   Chihara .................................... 385/92
5,317,663   5/1994   Beard et al. .............................. 385/70

FOREIGN PATENT DOCUMENTS 1-73306   3/1989   Japan ..................................... 385/92

Primary Examiner—John Ngo
Attorney, Agent, or Firm—Guy W. Shoup; Patrick T. Bever

[57]               ABSTRACT

An optical fiber connector designed so as to reduce the number of assembly steps and the number of component parts to reduce the manufacturing cost while maintaining improved characteristics under certain environmental conditions. The optical fiber connector has a sleeve fitted to a ferrule of a plug, a clamper engaged with the plug to hold the same, and a housing in which the clamper is held. The clamper is formed of a synthetic resin and has elastically-deformable leg portions and engaging portions. Engaging projections 16g to be engaged with the engaging portions of the clamper to hold the clamper in the housing are provided in the housing.

4 Claims, 7 Drawing Sheets

OPTICAL FIBER CONNECTOR

BACKGROUND OF THE INVENTION

1. Field of the Invention

The present invention relates to an optical fiber connector for optically connecting a fiber optic cable and another fiber optic cable or any other kind of optical element.

2. Description of the Related Art

As communication optical connectors or optical connectors for short-distance transmission data links, FC connectors for forming a connection by using a screw and SC connectors for forming a connection by resilience fitting (snap-fitting) are known.

Figure 7:
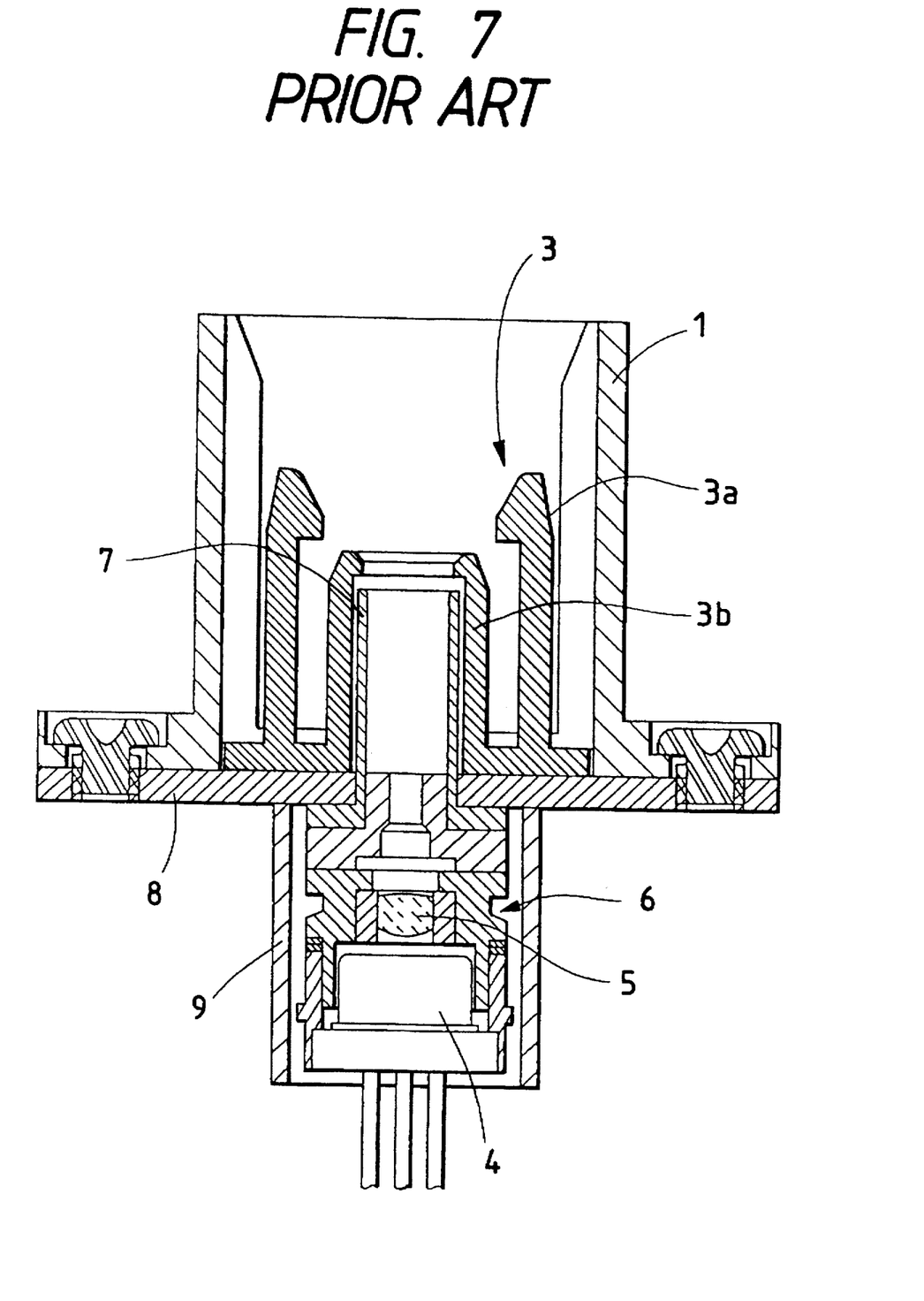
FIG. 7 is a cross-sectional view of a conventional optical fiber connector.
Figure 8:
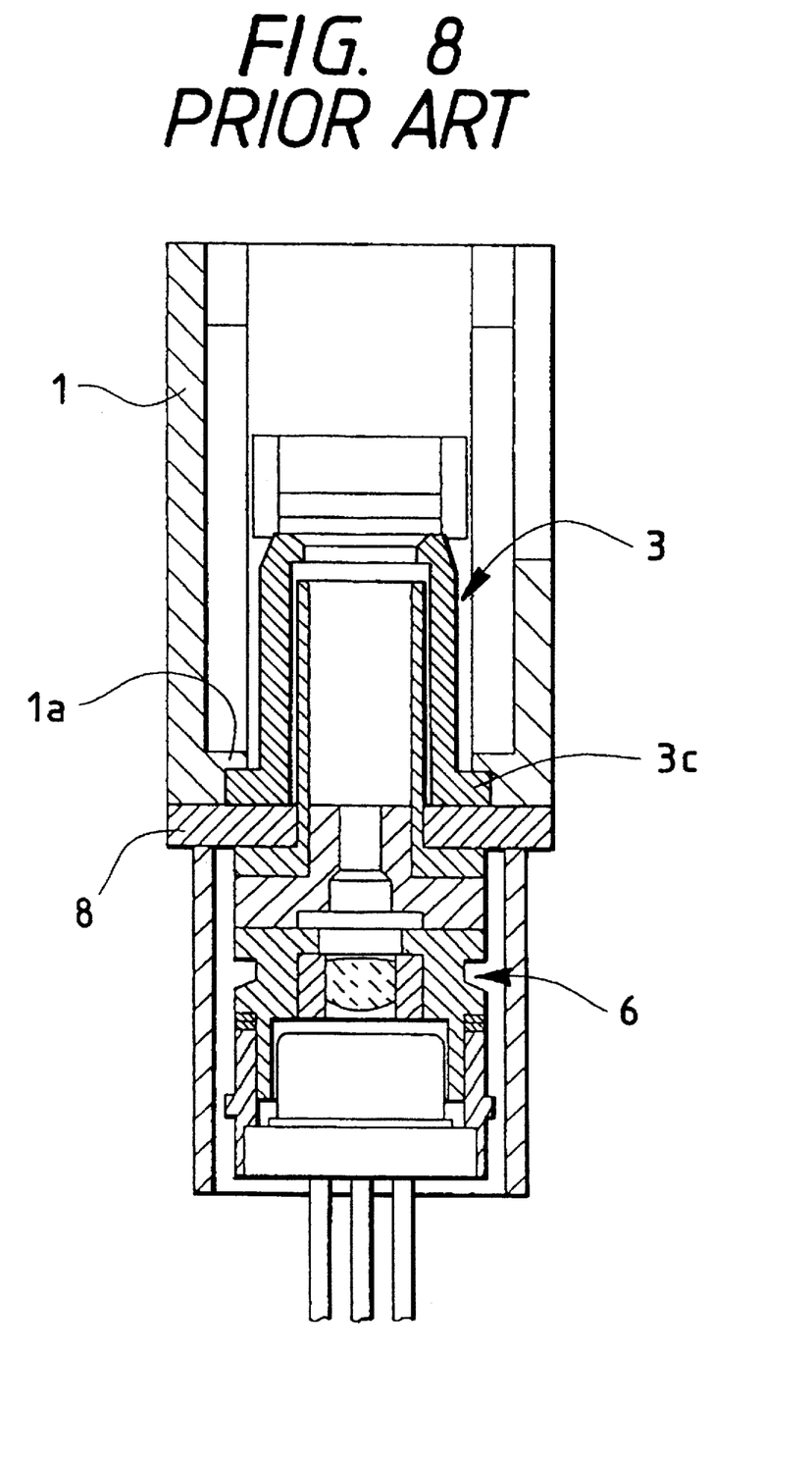
FIG. 8 is a cross-sectional view of the conventional connector viewed in another direction.

SC connector receptacles such as those illustrated in FIGS. 7 and 8 are known.

Figure 6:
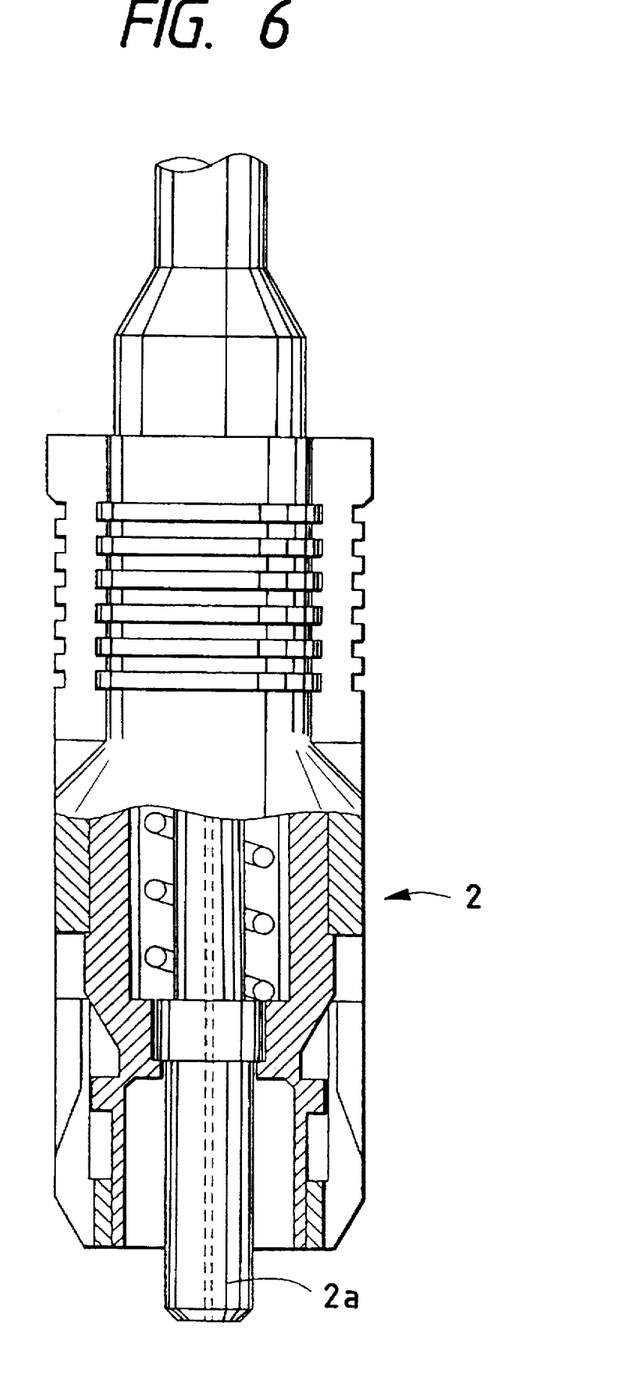
FIG. 6 is a cross-sectional view of a plug.

Each of such conventional receptacles has a synthetic resin clamper 3 in which a resilient engaging portion 3a resiliently fitted to a plug 2 shown in FIG. 6 and a cylindrical portion 3b for guiding a ferrule 2a of the plug 2 are formed; an optical element assembly 6 formed of an optical element 4, a lens 5 and other members; a sleeve 7 with which the ferrule 2a of the plug 2 is positioned; and a metallic holder 8. The receptacle is assembled in such a manner that the optical element assembly 6 and the sleeve 7 are fixed by being welded to the holder 8, the housing 1 in which the clamper 3 has been inserted is positioned by using a jig, and the housing 1 and the holder 8 are connected to each other with screws. The clamper 3 is held by having its engaging portion 3c pinched between the holder 8 and projections 1a provided on an inner portion of the housing 1. A component 9 is a cover for protection of the optical element assembly 6.

In the above-described receptacle construction, an assembly step of pinching the clamper 3 between the holder 8 and the housing 1 is required, so that the number of assembly steps is large.

There is also a need to position the holder 8 to which the optical element assembly 6 and the sleeve 7 are fixed and the housing 1 with a precision jig. Accordingly, the number of component parts is large and the number of assembly steps is also increased.

Further, the reliability with respect to changes in temperature is low because the metallic holder 8 and the housing 1 made of a synthetic resin are connected with screws, and the design freedom is reduced because of the need for space for fastening with screws.

SUMMARY OF THE INVENTION

In view of the above-described problem of the conventional art, an object of the present invention is to provide an optical fiber connector which is designed so as to reduce the number of assembly steps and the number of component parts to reduce the manufacturing cost, and which is capable of maintaining improved characteristics under certain environmental conditions.

To achieve this object, according to one aspect of the present invention, there is provided an optical fiber connector comprising a sleeve fitted to a ferrule of a plug, a clamper engaged with the plug to hold the same, and a housing in which the clamper is held, wherein the clamper is formed of a synthetic resin and has a flexible portion elastically deformable and an engaging portion, and wherein an engaging projection engageable with the engaging portion of the clamper to hold the clamper in the housing is provided in the housing.

According to the second aspect of the present invention, in the optical fiber connector provided in the first aspect of the invention, the flexible portion of the clamper is deformable in a direction substantially perpendicular to the direction of insertion of the plug into the optical fiber connector.

According to the third aspect of the present invention, in the optical fiber connector provided in the first or second aspect of the invention, the optical fiber connector is a receptacle having an optical element, and the housing has the shape of a rectangular tube generally closed at its bottom and has a positioning portion formed at its bottom to position an optical element assembly including the optical element.

According to the fourth aspect of the present invention, in the optical fiber connector provided in the third aspect of the invention, the housing is formed of a metal and the optical element assembly is fixed thereto by welding.

In the arrangement provided in the first aspect of the invention, the flexible portion of the clamper is elastically deformed to bring the engaging portion to a position at which the engaging portion is engaged with the engaging projection of the housing.

In the arrangement provided in the second aspect of the invention, the flexible portion of the clamper is deformed in a direction substantially perpendicular to the direction of insertion of the plug into the optical fiber connector, thereby making it possible to prevent the clamper from coming off by the plug attachment/detachment operation.

In the arrangement provided in the third aspect of the invention, the optical element assembly can be positioned easily with the positioning portion formed at the bottom of the housing.

In the arrangement provided in the fourth aspect of the invention, the housing is formed of a metal and the optical element assembly is fixed thereto by welding, thereby limiting changes in the relative positions of the component parts caused by changes in temperature as well as reducing the number of component parts.

DESCRIPTION OF THE PREFERRED EMBODIMENTS

Figure 2:
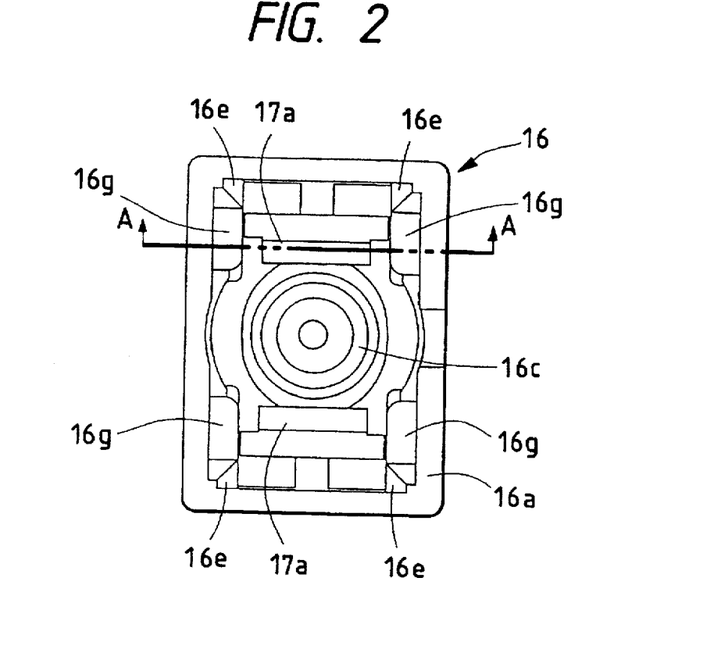
FIG. 2 is a plan view of the connector shown in FIG. 1.
Figure 3:
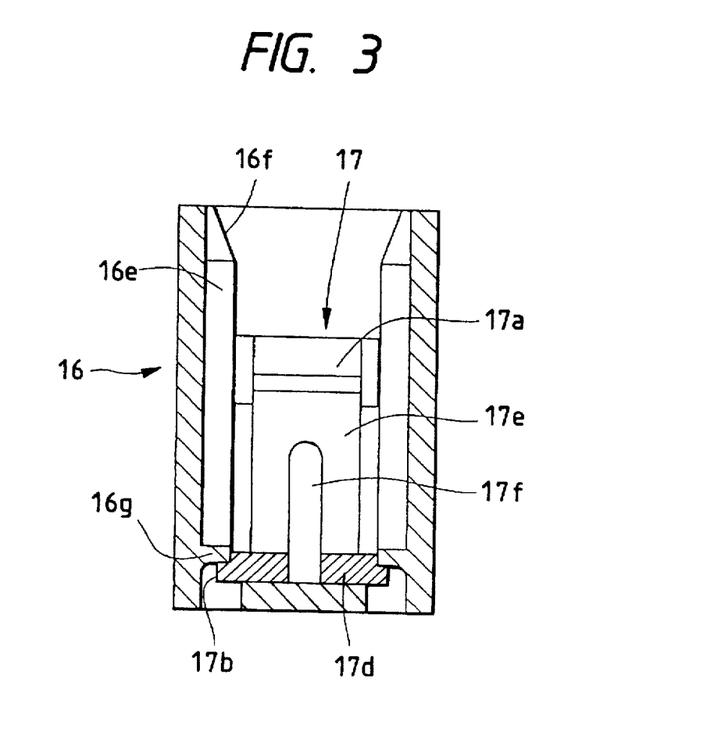
FIG. 3 is a cross-sectional view taken along the line A—A of FIG. 2.

The first embodiment of the present invention will be described with reference to FIGS. 1 to 3.

An optical element assembly 11 is provided which is constituted by an optical element 12 such as semiconductor laser device, a lens 13 and a metallic ferrule stopper 14. The direction along an optical axis and perpendicular to the optical axis of these components are adjusted on the basis of a stopper surface 14a of the ferrule stopper 14 so that the optical element 12 and an optical fiber cable (not shown) is optically connected, and each component is fixed by YAG laser welding. A resilient sleeve 15 in the form of a thin cylindrical tube and having a slot extending along the optical axis is welded to the ferrule stopper 14. This optical element assembly 11 is fixed on a housing 16 by partially inserting the resilient sleeve 15 and the ferrule stopper 14 into the housing 16. The housing 16 is made of stainless steel and is formed by metal injection molding. The housing 16 has a surrounding portion 16a in the form of a rectangular tube and a bottom portion 16b formed integrally with each other. On the bottom portion 16b, a cylindrical portion 16c and a cylindrical positioning portion 16d are provided. The cylindrical portion 16c projects inside the surrounding portion 16a and roughly guides a ferrule 2a so as to prevent deformation and damage of the resilient sleeve 15 when the plug 2 shown in FIG. 6 is attached to the receptacle. The cylindrical positioning portion 16d projects out of the surrounding portion 16a and serves to position the optical element assembly 11. An end surface of the projecting end and an inner diametral surface of the positioning portion 16d are accurately worked, and these surfaces are fitted to the ferrule stopper 14 to position the optical element assembly 11. The housing 16 and the optical element assembly 11 are connected by being joined to each other by YAG laser with the ferrule stopper 14 fitted to the end surface and the inner diametral surface of the positioning portion 16d.

Figure 1:
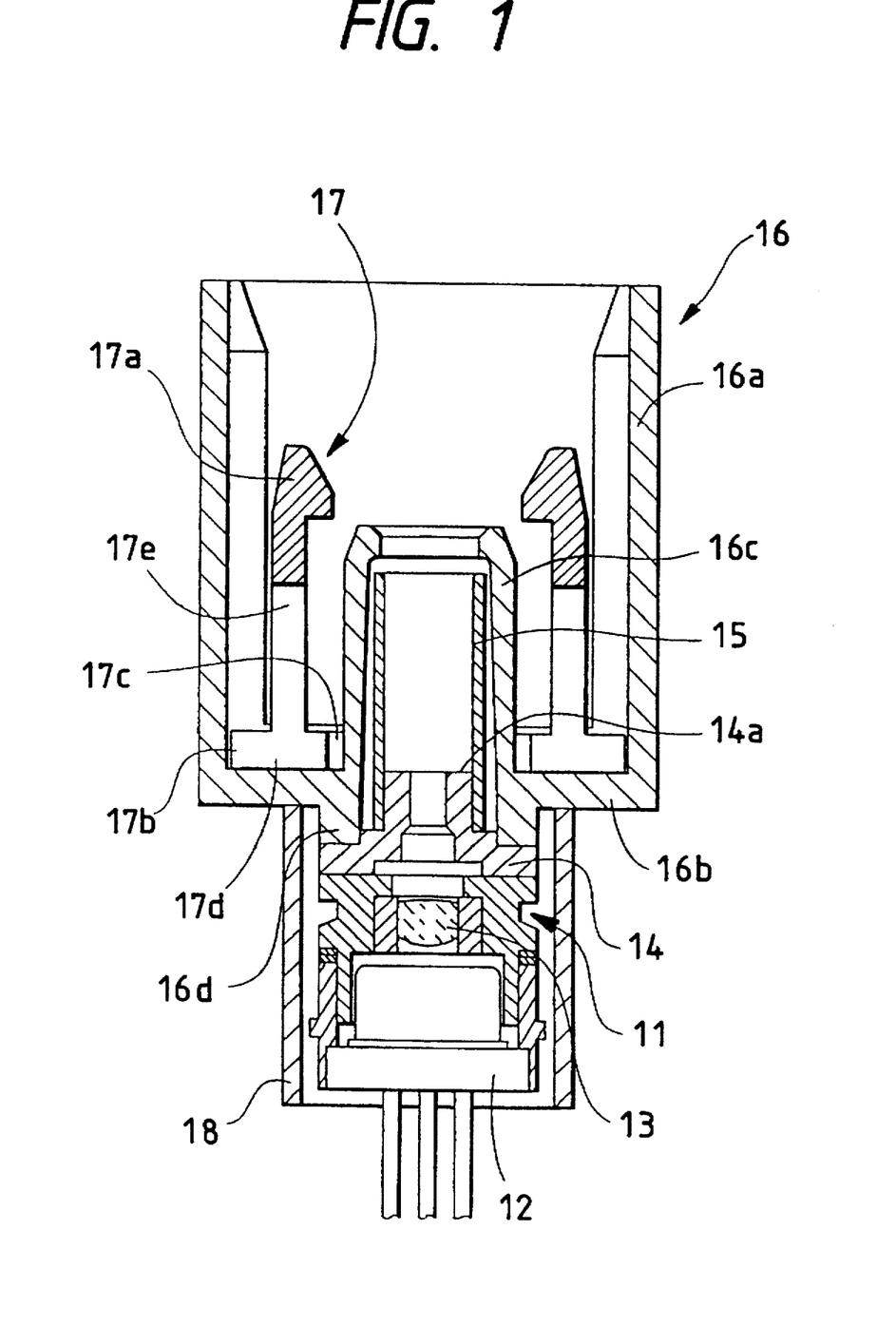
FIG. 1 is a cross-sectional view of an optical fiber connector in accordance with a first embodiment of the present invention.

Guide portions 16e are formed at four inner corners of the surrounding portion (outer wall) 16a so as to extend along the direction in which the plug is inserted (in the direction from the top toward the bottom of FIG. 1). The guide portions 16e serve to guide the plug 2 when the plug 2 is inserted and also to guide engaging portions of a clamper 17 described below when the clamper 17 is mounted in the housing 16. Slanted portions 16f are formed continuously with the guide portions 16e at positions close to the opening end of the surrounding portion 16a to facilitate insertion of the plug 2 and the clamper 17. Engaging projections 16g projecting inwardly are formed integrally with four corner portions of the surrounding portion 16a close to the bottom portion 16b. The clamper 17 is held by the engaging projections 16g and the bottom portion 16b.

The clamper 17 is formed by injection-molding a fiber reinforced aromatic polyester resin (also called polyarylate resin), and has a pair of resilient (first) engaging portions 17a facing each other and capable of engaging with the plug 2 to hold the same. The clamper 17 also has (second) engaging portions 17b for enabling the clamper 17 to be held on the housing, a base portion having a hole 17c through which the cylindrical portion 16c of the housing 16 is passed, and leg portions 17e which connect the base portion 17d and the resilient engaging portions 17a. These clamper portions are formed integrally with each other. When the plug 2 is inserted, the resilient engaging portions 17a are elastically deformed in directions opposite to the directions in which they face each other to allow insertion of the plug 2. Then the resilient engaging portions 17a engage with portions of the plug 2 to prevent the plug 2 from coming off.

Slits 17f are formed in the clamper 17 so as to extend from the base portion 17d into the leg portions 17e at centers of the same to reach positions in the vicinity of the resilient engaging portions 17a. The slits 17f enable the leg portions 17e to be deformed in such as direction as to reduce or increase the width of the slits 17f. Accordingly, the engaging portions 17b can move in a direction substantially perpendicular to the directions in which the resilient engaging portions 17a are deformable. With this movement, the engaging portions 17b can be positioned between the bottom portion 16b of the housing 16 and the engaging projections 16g and the clamper 17 can be fixed in the housing 16.

A component 18 which is a metallic cover is fixed to the housing 16 so as to accommodate the optical element assembly 11 therein in order to protect the optical element assembly 11.

The optical element assembly 11, the housing 16 and the clamper 17 are assembled by a process described below.

The optical element assembly 11 and the housing 16 are combined in such a manner that, as mentioned above, the ferrule stopper 14 of the optical element assembly 11 is positioned on the positioning portion 16d of the housing 16 and the ferrule stopper 14 and the positioning portion 16d are connected by laser welding.

When the clamper 17 is mounted in the housing 16, it is inserted into the plug 2 or temporarily inserted and fixed in a jig having substantially the same shape and size as the plug 2, and is inserted in the plug insertion direction into the housing 16 to which the optical element assembly 11 has been joined. As the clamper 17 is inserted into the housing 16, the engaging portions 17b are brought into contact with the guide portions 16e of the housing 1, and the leg portions 17e are elastically deformed along the direction of reducing the slits 17f (i.e., along the direction substantially perpendicular to the plug insertion direction and the direction of deformation of the resilient engaging portions 17a). When the engaging portions 17b reach the bottom portion 16b of the housing 16, they are released from the guide portions 16e to restore the original shape and to be simultaneously pinched between the bottom portions 16b of the housing 16 and the engaging projections 16g, thereby fixing the clamper 17 in the housing 16. Thereafter, the plug 2 or the jig is drawn out of the housing 16, thereby completing the process of assembling the receptacle.

In the receptacle constructed as described above, the housing 19 and the clamper 17 can be completely connected only by inserting the engaging portions 17b of the clamper 17 into the housing while deforming the leg portions 17e. The assembly process is therefore simplified. There is no possibility of the clamper 17 coming off by the plug attachment/detachment operation, because the direction of deformation of the leg portions 17e is substantially perpendicular to the direction of insertion of the plug and the direction of deformation of the resilient engaging portions 17a. When the engaging portions 17b are inserted into the housing 16, they are brought into contact with the slanted portions 16f and the guide portions 16e of the housing 16 to easily deform the leg portions 17e.

The housing 16 is made of a metal and the positioning portions 16d are formed so as to extend outward from the bottom 16b, and the ferrule stopper 14 of the optical element assembly 11 is welded thereto after being positioned, thus facilitating positioning of the optical element assembly 11 and limiting changes in the relative positions of the parts caused by changes in temperature as well as reducing the number of component parts. Thus, the assembly process is simplified, the design freedom is increased since there is no need for a screw-fastening space, and the reliability with respect to changes in temperature is improved. Specifically, if as in the above-described embodiment the housing 16 is made of a metal and if the clamper 17 is formed of a fiber reinforced aromatic polyester resin, a receptacle which meets the Bellcore (Bell Communications Research) standards can be realized.

Figure 4:
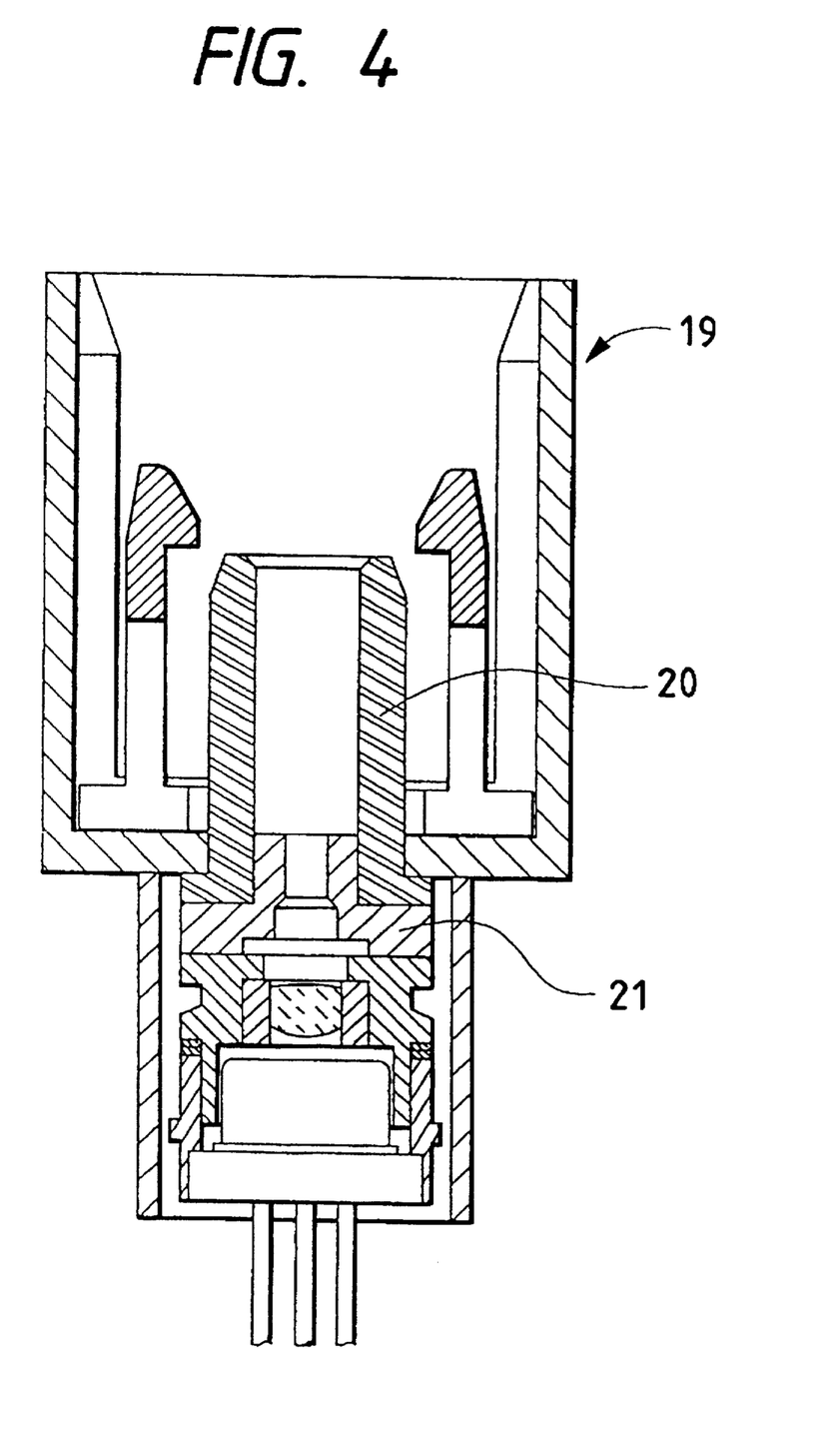
FIG. 4 is a cross-sectional view of an optical fiber connector in accordance with a second embodiment of the present invention.

The second embodiment of the present invention will be described with reference to FIG. 4. A housing 19, a sleeve 20, and a ferrule stopper 21 in the second embodiment differ from the corresponding components of the first embodiment. The other components, same as those of the first embodiment, will not be described.

The sleeve 20 is formed separately from the housing 19, and is made of stainless steel or zirconia. The sleeve 20 has a cylindrical shape and is disposed so as to project inside the housing 19. The sleeve 20 is finished to an inside diameter tolerance of several millimicrons and serves to position the ferrule of the plug and is positioned relative to the ferrule stopper 21, as in the case of the resilient sleeve 15 of the first embodiment. Further, an outside diametral surface of the sleeve 20 is used for positioning with the housing 19.

In this embodiment, the sleeve 20 is formed of a separate member. This member, however, may be formed integrally with some of the other component parts, for example, the ferrule stopper 21.

Figure 5:
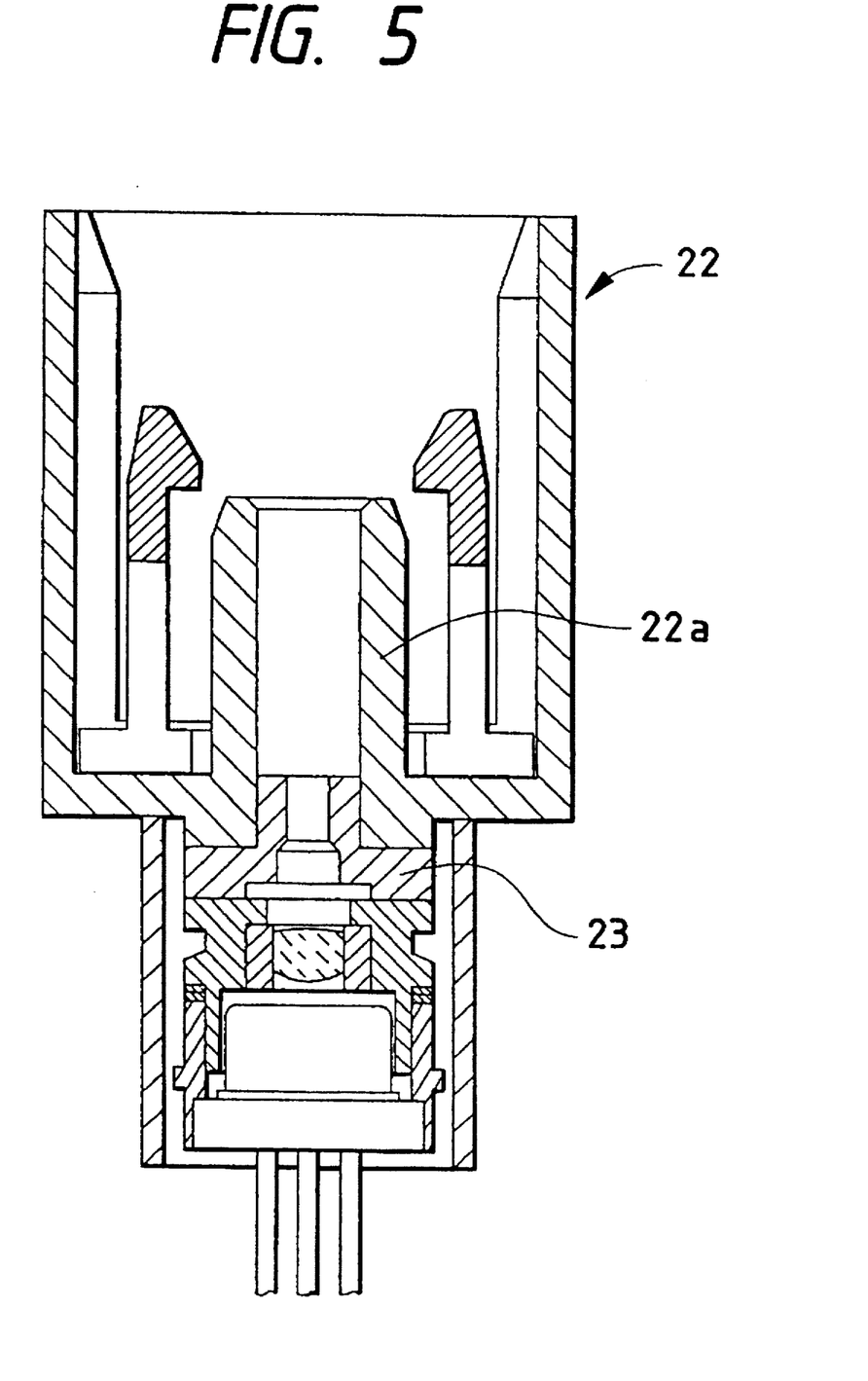
FIG. 5 is a cross-sectional view of an optical fiber connector in accordance with a third embodiment of the present invention.

The third embodiment of the present invention will be described with reference to FIG. 5. A cylindrical portion of a housing 22, and a ferrule stopper 23 in the third embodiment differ from the corresponding components of the first embodiment. The other components, same as those of the first embodiment, will not be described.

The housing 22 is formed by metal injection molding of stainless steel. The cylindrical portion 22a is thereafter accurately finished by cutting and plastic working. The ferrule stopper 23 is positioned by being inserted into the housing 22.

This embodiment is designed by removing the resilient sleeve 15 of the first embodiment, thereby further reducing the number of component parts.

In each of the above-described embodiments of the present invention, the housing 16, 19 or 21 is formed of a metal and, therefore, a flange with screws for attachment of the receptacle to a certain member, projections for positioning and fixing the receptacle on a circuit board or a metallic case in which a circuit board is to be mounted can be welded directly to the housing, or such a member can be formed integrally with the housing by metal injection molding, thereby reducing the number of parts related to the housing.

In the above-described embodiments, the leg portions 17e are formed as flexible portions elastically deformable for engagement through the engaging portions 17b. The arrangement may alternatively be such that elastically-deformable engaging portions 17 are formed to be engaged with the engaging projections 16g. In such a case, it is necessary that the force for connecting the engaging portions 17b and the engaging projections 16g is stronger than the force for connecting the resilient engaging portions 17a and the plug 2.

The embodiments of the present invention have been described as a receptacle having optical element 12. However, the present invention is also effective even if the optical fiber connector is a connector for optically connecting optical fiber cables, or a dual core type light receiving/emitting module.

As described above, according to the first aspect of the present invention, the flexible portions of the clamper are elastically deformed to bring the engaging portions of the clamper to such positions at which the engaging portions are engaged with the engaging projections of the housing. Therefore the assembly process can be simplified and a low-priced optical connector can be realized.

According to the second aspect of the present invention, the flexible portions of the clamper is deformed in a direction substantially perpendicular to the direction of insertion of the plug into the optical fiber connector, thereby preventing the clamper from coming off the housing by the plug attachment/detachment operation. Therefore an optical fiber connector easy to assemble and having improved reliability can be provided.

According to the third aspect of the present invention, the optical element assembly can be positioned easily by virtue of the positioning portion formed at the bottom of the housing. Therefore the number of assembly steps can be reduced, thereby realizing a further low-priced optical fiber connector.

According to the fourth aspect of the present invention, the housing is made of a metal and the optical element assembly is fixed by welding, thereby limiting changes in the relative positions of the component parts caused by changes in temperature as well as reducing the number of component parts. It is therefore possible to realize a low-priced optical fiber connector having improved characteristics with respect to environmental conditions and having increased design freedom.

What is claimed is:

1. An optical fiber connector for connecting an optical element assembly to an optical plug, the optical element assembly including a sleeve, the optical plug including a ferrule, the optical fiber connector comprising:

a housing including:
  a centrally-located cylindrical portion for receiving the sleeve of the optical element assembly,
  a bottom portion extending from the cylindrical portion,
  an outer wall extending from the bottom portion to an open end of the housing, the outer wall surrounding the cylindrical portion, and
  engaging projections located adjacent the bottom portion; and a clamper including:
  first engaging portions for engaging with the ferrule of the plug,
  second engaging portions for engaging with the housing, and
  elastic leg portions extending between the first and second engaging portions;

wherein the second engaging portions of the clamper are pinched between the bottom portion and the engaging projections of the housing, thereby fixing the clamper to the housing.

2. An optical fiber connector according to claim 1, wherein the housing further comprises guide portions located on an inner surface of the outer walls, the guide portions being formed such that the elastic leg portions of the clamper are deformed inward toward the cylindrical portion when the clamper is inserted through the open end of the housing and moved toward the bottom portion, the elastic leg portions returning to an undeformed condition when the second engaging portions are pinched between the bottom portion and the engaging projections of the housing.

3. An optical fiber connector according to claim 2, wherein said housing has the shape of a rectangular tube and has a positioning portion formed at its bottom to position an optical element of the optical element assembly.

4. An optical fiber connector according to claim 3, wherein said housing is formed of a metal and said optical element assembly is fixed thereto by welding.

* * * * *